United States Patent [19]
Hubbard et al.

[11] Patent Number: 5,622,320
[45] Date of Patent: Apr. 22, 1997

[54] FOILAGE COMPACTOR APPARATUS

[75] Inventors: John Hubbard, Walkerton; Douglas Foster, Chesterfield, both of Va.

[73] Assignee: Old Dominion Brush Company, Richmond, Va.

[21] Appl. No.: 622,599

[22] Filed: Mar. 26, 1996

[51] Int. Cl.$^6$ .......................... B02C 21/02; B02C 23/08
[52] U.S. Cl. ............... 241/56; 241/81; 241/101.742; 241/101.76
[58] Field of Search ............... 241/56, 81, 79.1, 241/101.742, 101.76, 101.763, 101.78

[56] References Cited

U.S. PATENT DOCUMENTS

| | | |
|---|---|---|
| 532,428 | 1/1895 | Robinson . |
| 1,150,286 | 8/1915 | Middlestate . |
| 1,455,908 | 5/1923 | Daniel . |
| 2,436,011 | 2/1948 | Lucas . |
| 2,529,993 | 11/1950 | Boyce et al. . |
| 2,661,584 | 12/1953 | Ronning . |
| 2,803,847 | 8/1957 | Hobbs . |
| 3,052,908 | 9/1962 | Daneman . |
| 3,189,286 | 6/1965 | O'Connor ............... 241/101.76 X |
| 3,613,915 | 10/1971 | Vita . |
| 3,664,645 | 5/1972 | Cobey . |
| 3,733,033 | 5/1973 | Cobey . |
| 3,776,528 | 12/1973 | Toto . |
| 3,881,707 | 5/1975 | Toto . |
| 3,907,216 | 9/1975 | Mackissie et al. ............... 241/101.78 X |
| 3,952,889 | 4/1976 | Wanker et al. . |
| 3,995,754 | 12/1976 | Dekoning . |
| 4,016,994 | 4/1977 | Wurster . |
| 4,200,950 | 5/1980 | Coverly . |
| 4,213,571 | 7/1980 | Deardorff et al. ............... 241/48 |
| 4,220,289 | 9/1980 | Phillips et al. . |
| 4,247,228 | 1/1981 | Gray et al. . |
| 4,287,708 | 9/1981 | Neely et al. . |
| 4,304,361 | 12/1981 | Campbell ............... 241/24 |
| 4,432,676 | 2/1984 | Jacobson et al. . |
| 4,537,362 | 8/1985 | Zuloaga . |
| 4,659,262 | 4/1987 | Van Aalst . |
| 4,785,761 | 11/1988 | Greenbank . |
| 4,951,882 | 8/1990 | Ober ............... 241/55 |
| 5,195,852 | 3/1993 | Malugani et al. . |
| 5,226,757 | 7/1993 | Tarrant . |
| 5,240,188 | 8/1993 | Whitmire ............... 241/29 |
| 5,428,864 | 7/1995 | Pemberton . |
| 5,542,617 | 8/1996 | Rajewski ............... 241/101.761 |

*Primary Examiner*—John M. Husar
*Attorney, Agent, or Firm*—Hovey, Williams, Timmons & Collins

[57] ABSTRACT

A foliage compactor includes an impeller assembly supported on a frame and including an enclosure having an inlet and an outlet, and an impeller supported for rotation within the enclosure to produce suction at the inlet and positive pressure at the outlet. An elongated hose is connected to the inlet so that foliage is drawn into the impeller assembly through the hose. A cyclone separator is supported on the frame beside the impeller assembly, and presents an upper inlet connected to the outlet of the impeller assembly so that air and foliage under positive pressure are introduced into the cyclone separator by the impeller assembly. The cyclone separator includes an outlet disposed lower than the inlet, and an exhaust vent located higher than the outlet for exhausting air from the housing. A thresher assembly is supported on the frame at the outlet of the cyclone separator and includes a plurality of fixed and movable hammers that cooperate to compact foliage falling through the cyclone separator into the thresher.

10 Claims, 3 Drawing Sheets

FOILAGE COMPACTOR APPARATUS

BACKGROUND OF THE INVENTION

1. Field of the Invention

The present invention relates to a portable foliage compactor apparatus for collecting and compacting leaves, grass and other foliage or yard waste.

2. Discussion of the Prior Art

It is known to provide a yard waste collection vehicle that enables the collection and transport of a number of different types of yard waste. Such a vehicle includes a separate hopper for storing such waste apart from other types of trash, and a leaf vacuum system for picking up the yard waste and conveying it to the hopper.

The leaf vacuum system in the known construction includes a blower/grinder system including a suction hose that extends from the side of the truck and is supported by a hydraulically-assisted lift system. Vacuumed yard waste passes through the hose and into the blower/grinder where it is chopped into smaller pieces and blown through a chute into the hopper for transportation to a composting site.

OBJECTS AND SUMMARY OF THE INVENTION

It is an object of the present invention to provide a compactor apparatus that provides more complete compacting of yard waste, significantly reducing the particle size of the waste to expedite composting.

It is another object of the invention to provide a compactor apparatus with an impeller and thresher in line with one another so that a single drive shaft operates both during use of the apparatus. A cyclone separator is connected between an output of the impeller and an input of the thresher for separating the collected yard waste from the air generated by the impeller prior to threshing of the waste.

In accordance with these and other objects evident from the following description of a preferred embodiment of the invention, a foliage compactor apparatus is provided which includes an impeller assembly, a cyclone separator, and a thresher, all supported on a mobile frame. The impeller assembly includes an enclosure having an inlet and an outlet, and an impeller supported for rotation within the enclosure to produce suction at the inlet and positive pressure at the outlet. An elongated hose is provided on the apparatus and includes an outlet connected to the inlet of the impeller assembly and an opposed inlet into which foliage is drawn by the suction of the impeller assembly.

The cyclone separator of the apparatus presents an upper inlet connected to the outlet of the impeller assembly so that air and foliage under positive pressure are introduced into the cyclone separator by the impeller assembly. The cyclone separator includes an outlet disposed lower than the inlet, and an exhaust vent located higher than the outlet for exhausting air from the housing. The thresher includes a plurality of fixed and movable teeth that cooperate to compact foliage falling through the cyclone separator into the thresher.

By providing a compactor apparatus constructed in accordance with the present invention, numerous advantages are realized. For example, by providing the combination of an impeller assembly, cyclone separator, and thresher, it is possible to obtain a very high bulk reduction percentage immediately upon compacting foliage in the apparatus. Such increased bulk reduction cuts compost time from 1–3 years to 60–90 days, expediting composting of the waste significantly.

In addition, by providing a thresher of the type shown and described in the preferred embodiment, bulk reduction of the foliage is further improved, increasing the effect of the compactor apparatus and further reducing compost time.

BRIEF DESCRIPTION OF THE DRAWING FIGURES

The preferred embodiment of the present invention is described in detail below with reference to the attached drawing figures, wherein.

DETAILED DESCRIPTION OF THE PREFERRED EMBODIMENT

Figure 1:
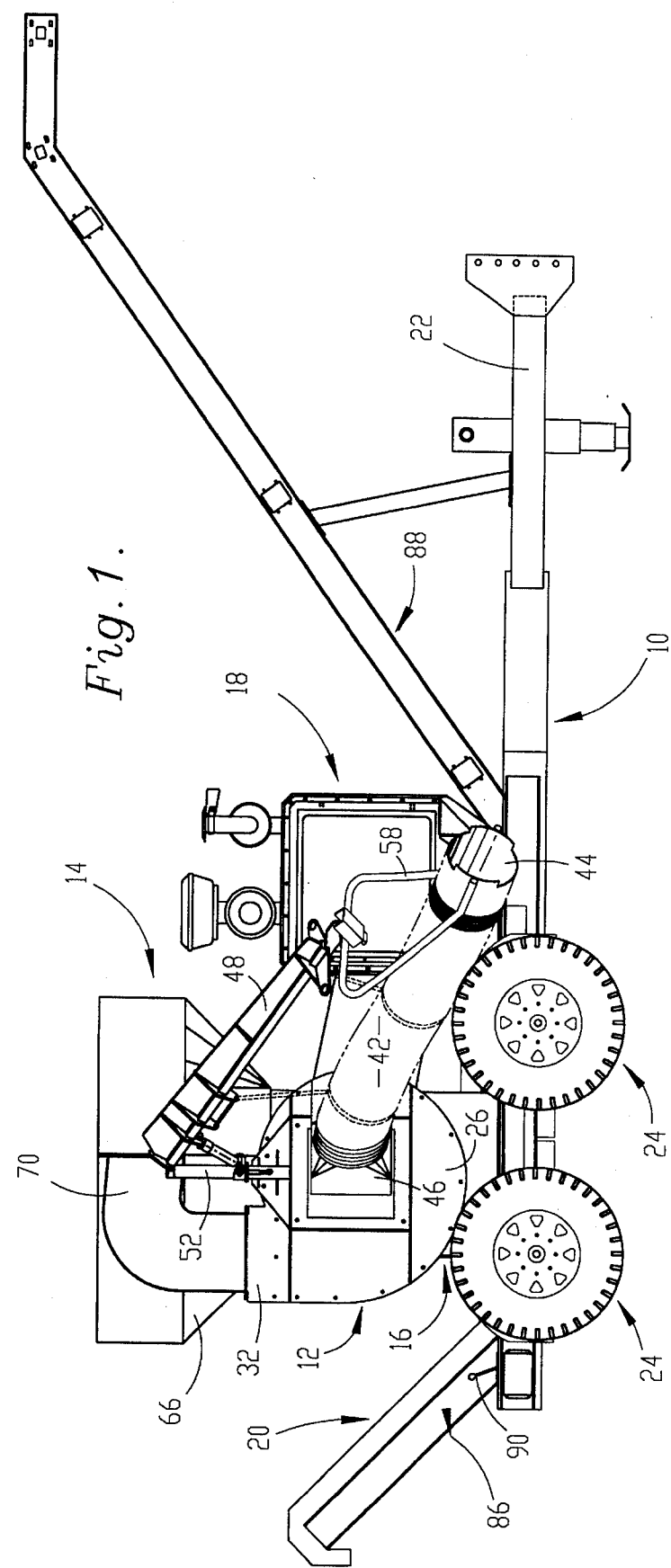
FIG. 1 is a side elevational view of a foliage compactor apparatus constructed in accordance with the preferred embodiment.

The compactor apparatus of the preferred embodiment is illustrated in FIG. 1, and broadly includes a mobile trailer 10 on which an impeller assembly 12, a cyclone separator 14, a thresher 16, an engine 18, and a conveyor assembly 20 are supported.

The trailer 10 includes a front end having a tongue assembly 22 and a rear end adjacent to which a pair of transverse wheel and axle sets 24 are supported. The trailer is preferably constructed of heavy-duty tubular steel, and provides a platform on which the other components of the apparatus are supported. The tongue assembly 22 permits the apparatus to be towed behind a truck or other vehicle.

Figure 2:
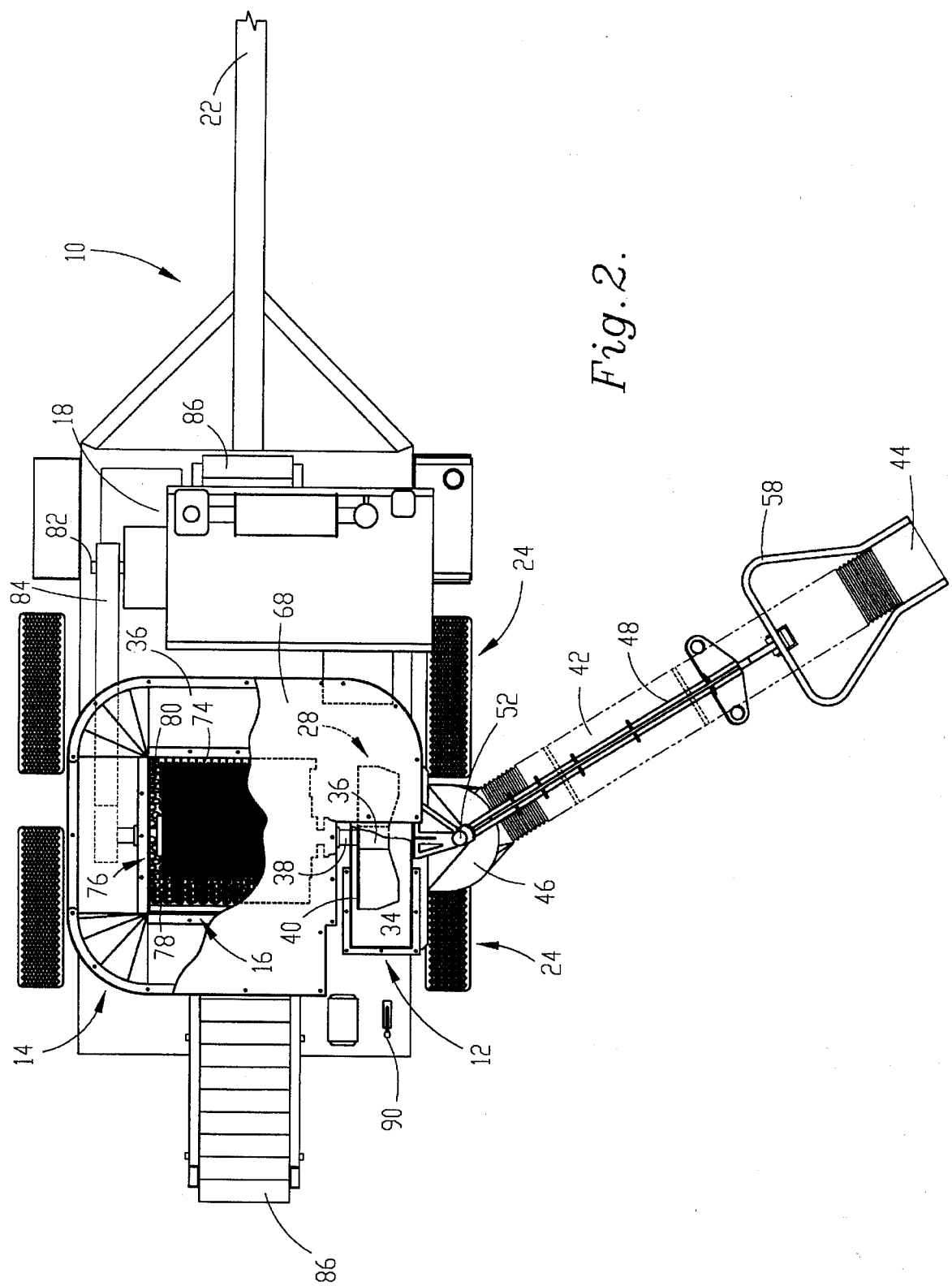
FIG. 2 is a top plan view of the apparatus, partially cut away to illustrate a thresher forming a part of the apparatus.
Figure 3:
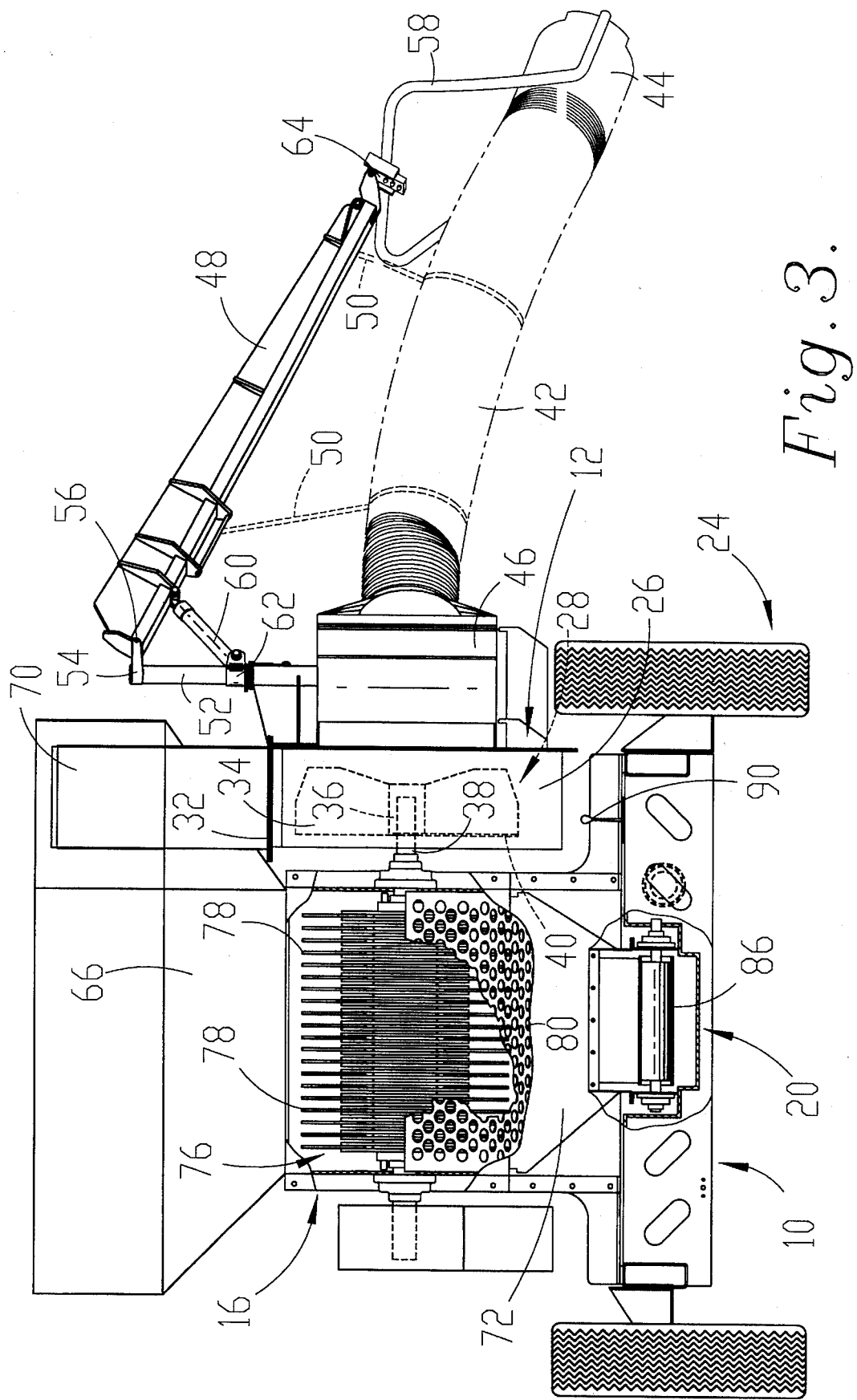
FIG. 3 is a rear end elevational view of the apparatus, partially cut away to illustrate a conveyor forming a part of the apparatus and other features of the thresher.

The impeller assembly 12 is illustrated in FIG. 2, and broadly includes an enclosure 26 within which an impeller 28 is supported for rotation. The enclosure 26 is fixedly supported on the trailer, and includes a curbside inlet 30 on one side of the trailer, and an outlet 32 extending upward out of the enclosure, as shown in FIG. 1. The enclosure is generally cylindrical in shape, defining a horizontally extending central longitudinal axis. As shown in FIG. 3, the inlet 30 extends from the enclosure in a direction parallel to the central axis while the outlet 32 extends upward in a direction perpendicular to the central axis.

Returning to FIG. 2, the impeller 28 includes a plurality of blades 34 that are secured on a hub 36. A drive shaft 38 extends into the enclosure along the central axis and supports the hub so that the blades rotate with the shaft and create a vacuum at the inlet, e.g. 19,000 CFM or greater. In an exemplary embodiment, the impeller presents a 28 inch diameter and includes one inch thick blades formed of abrasive resistant T-1 steel with a Brinell hardness of 400. A backing plate 40 is preferably provided on the impeller and is connected to the inner axial end of the hub and to the inner edges of the blades. Preferably, the hub is tapered toward the outer end of the drive shaft to provide a secure fit between the hub and the drive shaft, and to facilitate replacement of the impeller.

An elongated hose 42 is provided for picking up yard waste, and includes an outlet connected to the inlet 30 of the enclosure 26 and an opposed inlet 44 into which waste is drawn by the suction of the impeller assembly. The hose 42 is preferably formed of urethane or other suitable material, and is of a diameter, e.g. 14 inches, that is large enough to convey most yard waste to the apparatus. A turret 46 supports the hose on the impeller assembly, and is supported within the inlet for pivotal movement about a vertical axis. The turret includes an inner opening communicating with the inlet of the enclosure 26 and an outer opening connected to the outlet of the hose 42. Thus, the turret defines a swivel which permits the orientation of the hose outlet relative to the inlet 30 to be adjusted.

A vertical shaft 52 is secured to the enclosure 26 by one or more horizontal mounting plates that are spaced vertically from one another by grommets. A boom 48 is supported on the vertical shaft for suspending the hose and permitting manipulation of the inlet. A pair of chains 50 extend between the boom and the hose to suspend the hose beneath the boom. The boom is supported on the vertical shaft by a collar 54 that permits side-to-side pivotal movement of the boom, and is connected to the collar by a horizontally extending pivot pin 56 that enables the boom to be raised and lowered. A steel handle 58 is secured to the hose adjacent the inlet and is connected to the remote end of the boom so that side-to-side and up-and-down movement of the boom is conveyed to the hose.

A piston and cylinder assembly 60 is supported between the vertical shaft 52 and the boom 48 for moving the boom up and down to raise and lower the hose inlet. The piston and cylinder assembly is supported on the vertical shaft 52 by a collar 62 which permits the assembly to pivot with the boom relative to the shaft 52. Preferably, the piston and cylinder assembly is actuated electrically, and a control mechanism 64 is provided on the handle for permitting an operator to move the boom on demand to raise and lower the hose. Side-to-side movement of the boom and hose is preferably achieved manually.

The cyclone separator 14 is supported on the trailer immediately above the thresher 16 and to the inboard side of the impeller assembly 12. The purpose of the separator is to allow the materials drawn into the apparatus to be separated from the air flow and enter the thresher. The separator includes a tapered pan 66 presenting an open upper end and an open lower end. As shown in FIG. 2, the upper end is fitted with an air screen or the like so that air entering the separator is free to pass out the upper end while material is retained in the separator. An upper inlet is provided immediately beneath the upper end of the separator and extends horizontally to the rear end of the trailer, and is connected to the outlet 32 of the impeller assembly by an elbow duct 70 including a 90° turn. The open lower end of the tapered pan defines an outlet that is positioned beneath the inlet so that material entering the separator falls through the outlet as it is separated from the air that is exhausted from the separator.

As shown in FIG. 3, the thresher 16 is supported on the trailer immediately inboard of the impeller assembly 12, and broadly includes a horizontally extending cylindrical housing 72, a plurality of fixed teeth 74 secured to the housing, as shown in FIG. 2, and a rotatable arbor assembly 76 provided with movable teeth 78 that cooperate with the fixed teeth to compact foliage falling through the cyclone separator into the thresher.

Returning to FIG. 3, the housing 72 presents an upper inlet communicating with the open lower end of the cyclone separator so that material falling through the separator enters the thresher housing. The housing presents a lower cylindrical sidewall 80 that is perforated to present a plurality of outlet openings through which compacted foliage is discharged by the thresher. As shown in FIG. 2, the fixed teeth are secured to the housing immediately above the lower cylindrical sidewall in front of the arbor assembly 76. Each tooth extends generally horizontally into the housing toward the arbor assembly, and the fixed teeth are spaced from one another by a distance sufficient to permit the passage of one of the movable teeth during rotation of the arbor assembly. Thus, when the arbor assembly is rotated, the movable teeth each pass closely between a pair of the fixed teeth so that foliage trapped between the fixed teeth is compacted by the relative movement of the arbor assembly and the fixed teeth.

The arbor assembly 76 includes the drive shaft 38 that also supports the impeller 28 of the impeller assembly 12 so that rotation of the drive shaft operates both the arbor assembly and the impeller. A plurality, e.g. 36, of the free swinging movable teeth 78 are supported on the drive shaft so that each tooth can be pivoted relative to the drive shaft about an axis extending in a direction parallel to the shaft. Spacers are provided on the shaft for separating the movable teeth from one another along the length of the drive shaft so that each tooth is aligned with a gap between a pair of the fixed teeth supported on the housing. Both the fixed and movable teeth are preferably constructed of abrasive resistant steel.

The engine 18 is preferably a six cylinder diesel engine, and includes an output shaft 82 that is connected to the drive shaft by a drive belt 84 or other suitable transmission mechanism. The belt 84 rotates the drive shaft 38 in a clockwise direction as viewed in FIG. 1 so that the impeller draws foliage into the inlet and exhausts it along with air under pressure into the cyclone separator, and so that the movable teeth on the arbor assembly rotate downward past the fixed teeth to compact foliage within the thresher.

The conveyor assembly broadly includes a rear conveyor 86 and a forward conveyor 88. The rear conveyor 86 is shown in FIG. 2, and carries shredded material discharged from the thresher to the rear end of the trailer where it is deposited into a windrow pile up to 48 inches in height. The rear conveyor includes a corrosion-resistant polypropylene belt supported on rollers and extending beneath the thresher and the engine between a front end located forward of the engine and a rear end at the top of the angled conveyor frame extending beyond the rear end of the trailer. The rear conveyor is preferably chain-driven by a reversible hydraulic motor that is powered by an engine-driven hydraulic pump. The conveyor is controlled with a hand valve 90 located at the rear end of the trailer.

The forward conveyor is shown in FIG. 1, and can be removably attached to the trailer for conveying shredded material out of the thresher past the front end of the trailer where it is deposited into a hopper or the like that is supported on the towing vehicle. The forward conveyor 88 can be made removable to permit optional use of it when desired. Preferably, the forward conveyor includes a belt similar to the belt of the rear conveyor, and the belt is supported on rollers at each end of the forward conveyor frame. As with the rear conveyor, the forward conveyor is also chain-driven by the reversible hydraulic motor and is controlled by the same hand valve. Thus, when the forward conveyor is attached to the apparatus, both conveyors are driven in a first direction conveying shredded material to and along the forward conveyor to the front of the trailer. When the forward conveyor is removed, the rear conveyor is driven in a second direction conveying shredded material to the rear of the trailer.

During operation, the apparatus is towed to a position alongside of a pile of foliage or yard waste that is to be compacted. The engine is turned on and drive is provided to the drive shaft 38 so that the thresher 16 and impeller assembly 12 are activated. An operator standing beside the inlet end of the hose 42 swings the hose and boom 48 from side-to-side to position the inlet against the foliage. If necessary, the operator can raise and lower the hose by manipulating the control mechanism 64 on the handle, as shown in FIG. 3, such that the piston and cylinder assembly raises or lowers the boom by the desired amount.

The impeller 28 creates a vacuum within the hose that draws foliage into the impeller enclosure 26. The foliage and air drawn into the assembly are forced under positive pressure from the outlet of the enclosure, through the duct 70, to the upper end of the cyclone separator. Within the separator, air is forced under pressure through the screen 68, shown in FIG. 2, while the foliage is trapped beneath the screen and falls through the lower end into the thresher.

Within the thresher 16, the foliage is moved toward the front side of the housing and is shredded by the cooperation of the fixed and movable teeth. The apertures in the bottom sidewall 80 of the housing permit the shredded foliage to be discharged from the thresher and conveyed from the apparatus. Any foliage not small enough to be discharged through the apertures is drawn back into the thresher by the movable arbor assembly 76 and is reintroduced between the teeth where it is shredded again until it is of a size small enough to be discharged.

The conveyor assembly 20 is activated by the control valve to convey the compacted foliage to the rear end of the trailer when the forward conveyor is not provided. However, if the forward conveyor 88 is used, as shown in FIG. 1, the valve 90 can be actuated to reverse the direction of the conveyor assembly so that compacted foliage is conveyed to the forward conveyor at the front of the trailer.

Although the present invention has been described with reference to the preferred embodiment, it is noted that equivalents may be employed and substitution made herein without departing from the scope of the invention as recited in the claims.

What is claimed is:

1. A foliage compactor apparatus comprising:

a frame;

an impeller assembly supported on the frame and including an enclosure having an inlet and an outlet, and an impeller supported for rotation within the enclosure to produce suction at the inlet and positive pressure at the outlet;

an elongated hose including an outlet connected to the inlet of the impeller assembly and an opposed inlet to which foliage to be compacted is drawn by the suction of the impeller assembly; and a cyclone separator and a thresher operatively coupled together for passage of said foliage to be compacted in serial order first through said cyclone separator and then through said thresher for compaction of the foliage to be processed, said cyclone separator supported on the frame and presenting an upper inlet connected to the outlet of the impeller assembly so that air and said foliage to be compacted under positive pressure are introduced into the cyclone separator by the impeller assembly prior to passage of said foliage to be compacted through said thresher, the cyclone separator including an outlet disposed lower than the inlet, and an exhaust vent located higher than the outlet for exhausting air from the apparatus;

said thresher supported on the frame at the outlet of the cyclone separator for receiving said foliage to be compacted only after passage thereof through the cyclone separator for compacting foliage falling through the cyclone separator and into and through the thresher.

2. An apparatus as recited in claim 1, wherein the thresher includes a plurality of fixed and movable teeth that cooperate to compact said foliage, the thresher further including a rotatable shaft on which the movable teeth are supported, the shaft rotating the moving teeth past the fixed teeth to compact foliage passing through the thresher.

3. An apparatus as recited in claim 2, wherein the impeller includes a rotatable central shaft and a plurality of impeller blades supported on the shaft.

4. An apparatus as recited in claim 3, further comprising a single drive means for driving rotation of both the thresher shaft and the impeller shaft.

5. An apparatus as recited in claim 2, wherein the fixed teeth are side-by-side in the thresher, and are spaced laterally from one another by a distance only slightly greater than the thickness of each of the movable teeth, and the movable teeth are supported for rotation past the fixed teeth so that each movable tooth passes between a pair of the side-by-side fixed teeth.

6. An apparatus as recited in claim 5, wherein the thresher includes a rotatable arbor on which the movable teeth are supported, the movable teeth being pivotable relative to the arbor about an axis parallel to the arbor.

7. An apparatus as recited in claim 6, wherein the thresher includes an outlet and a screen covering the outlet, the screen including a plurality of openings through which compacted foliage passes from the thresher such that foliage larger than the openings is retained in the thresher and compacted further, the screen being curved so that it is spaced a uniform distance from the movable teeth through the arc of rotation of the teeth.

8. An apparatus as recited in claim 1, further comprising a conveyor for conveying compacted foliage away from the thresher.

9. An apparatus as recited in claim 5, further comprising a motor for driving the conveyor, the motor being bidirectional so that the conveyor can be driven in either direction relative to the thresher.

10. An apparatus as recited in claim 1, wherein the thresher includes an outlet and a screen covering the outlet, the screen including a plurality of openings through which compacted foliage passes from the thresher such that foliage larger than the openings is retained in the thresher and compacted further.

* * * * *